T. T. SEAL.
ANTISKID ATTACHMENT FOR AUTOMOBILES.
APPLICATION FILED MAY 6, 1916.
1,203,141.
Patented Oct. 31, 1916.
2 SHEETS—SHEET 1.
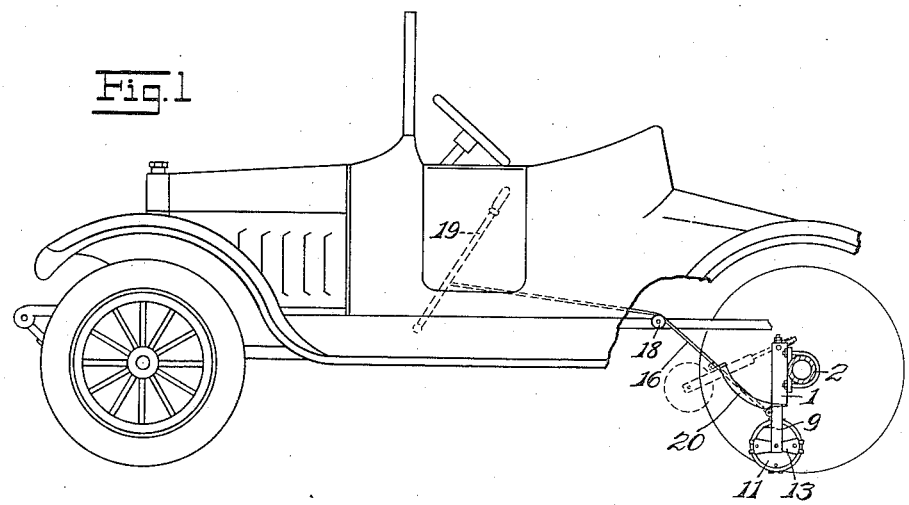
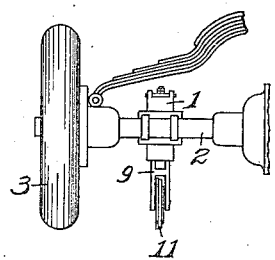
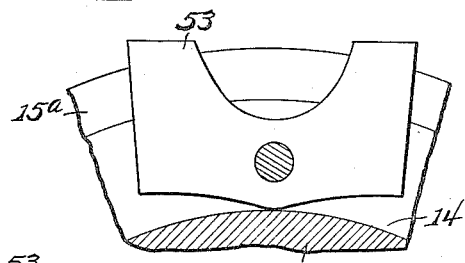
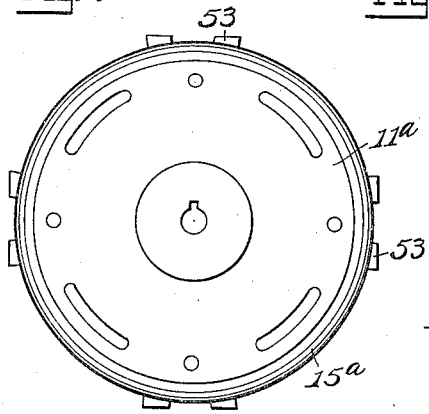
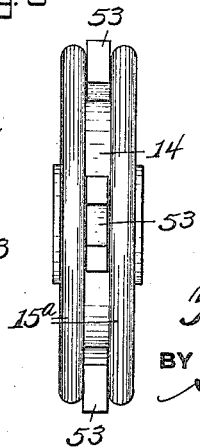
INVENTOR
T. T. Seal.
BY
ATTORNEY

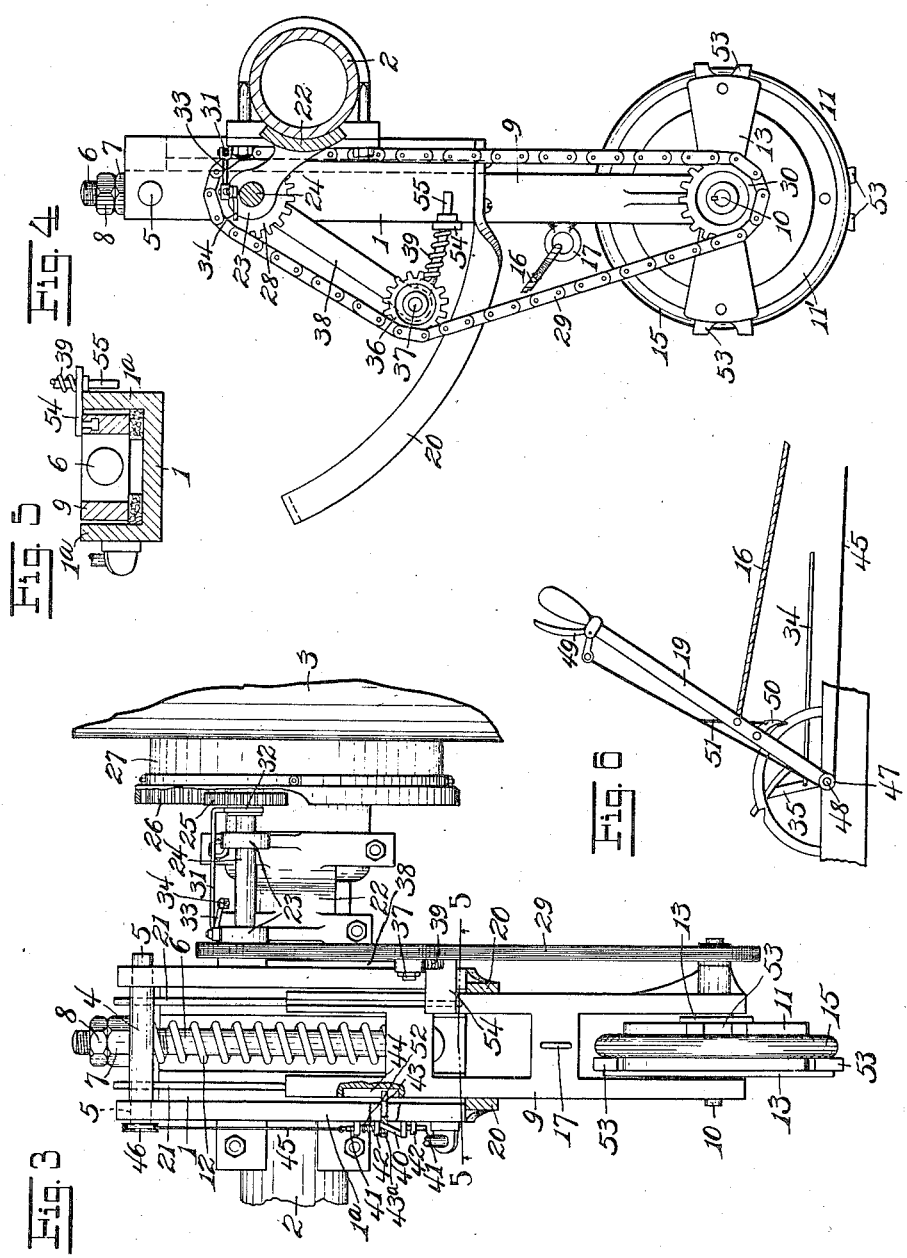

UNITED STATES PATENT OFFICE.

THEODORE T. SEAL, OF BELLAIRE, OHIO.

ANTISKID ATTACHMENT FOR AUTOMOBILES.

1,203,141.  Specification of Letters Patent.  Patented Oct. 31, 1916.

Application filed May 6, 1916.  Serial No. 95,810.

*To all whom it may concern:*

Be it known that I, THEODORE T. SEAL, a citizen of the United States of America, and resident of Bellaire, county of Belmont, and State of Ohio, have invented certain new and useful Improvements in Antiskid Attachments for Automobiles, of which the following is a specification.

This invention relates broadly to anti-skid devices, and more particularly to an anti-skid attachment for motor cars.

The primary object of the invention is to provide an apparatus designed for mounting upon the rear axle of an automobile and adapted to yieldingly engage the ground for preventing the side-slipping or skidding of an automobile, said device being readily movable to and from operative position.

A further object is to provide a device of the character mentioned which has associated therewith gearing whereby, when occasion requires, it may be employed to afford traction for the car, as for assisting the rear wheels of the car from a hole or ditch.

With these and other objects in view, the invention resides in the features of construction, arrangement of parts and combinations of elements which will hereinafter be exemplified, reference being had to the accompanying drawings, forming a part of this specification, in which—

Figure 1 is a side elevation of the invention applied to an automobile; Fig. 2 is a rear elevation of a portion of an axle with the invention applied thereto; Fig. 3 is an enlarged front elevation of the same.; Fig. 4 is a sectional elevation, the section being taken at a point closely adjacent to the sprocket chain; Fig. 5 is a transverse section on line 5—5, Fig. 3; Fig. 6 is an enlarged side elevation of the operating lever; Fig. 7 is an enlarged side elevation of a modified form of road-engaging disk or wheel; Fig. 8 is an edge view of the same; and Fig. 9 is an enlarged detail section of a part of the road-engaging wheel showing a rocker carried thereby.

Referring to said drawings, in which like designating characters distinguish like parts throughout the several views—1 indicates a bracket of substantially channel-bar form in cross section which is rigidly mounted in an upright position against the front face of the rear axle 2 of an automobile at a suitable point adjacent to one of the traction wheels 3. A horizontally disposed crosshead 4 has trunnions 5 loosely mounted in the side members of said bracket adjacent to the upper ends of the latter so as to have a slight rotary movement, and vertically movable through said crosshead at a central point is the upper portion of an upright bolt 6 which has an adjusting nut 7 threaded upon its upper end and a jam-nut 8 seated against said adjusting nut. Carried upon the lower end of the bolt 6 and axially alined with the latter is a frame 9 having a bifurcated lower end in which is journaled an axle 10 having a wheel or disk 11 keyed thereon. A spiral spring 12 disposed between the crosshead 4 and the frame 9 and located in encircling relation to the bolt 6 serves, when said frame occupies a vertical position, to yieldingly hold the latter depressed in a position wherein the periphery of said wheel 11 is in contact with the ground or roadway upon which the vehicle travels. Pivotally mounted on said wheel 11 so that their terminals project outward from the periphery thereof is a plurality of suitably spaced rocker-members 53 of substantially U-shape, said terminals being adapted to tread upon the roadway in such manner as to retard, if not to positively prevent, lateral or skidding movement of said wheel and, through the intermediate mechanism, to resultantly retard or prevent such movement of the rear end of the car. In the preferred form of wheel illustrated in Figs. 1, 2, 3 and 4, the rocker members are pivotally mounted between the wheel rim 11' and lateral diametrically disposed plates 13 fixed upon said wheel, two members being located in diametrically opposite relation on each of the two sides of the wheel. Said members may, however, be located in a central annular channel 14 provided in the periphery of the wheel, as shown in Figs. 7, 8 and 9. A band or tire 15 of rubber is preferably employed for partially deadening the noise resulting from travel of the wheel upon the roadway; or, when the annularly channeled wheel of Figs. 7, 8 and 9 is used, two such tires 15ª may be used, as shown.

When not in use, the frame 9 and wheel 11 are held in a position wherein the latter is elevated out of contact with the roadway, as is shown in dotted lines in Fig. 1, and are dropped to operative position only when occasion renders the employment of the device necessary or expedient. The elevating means herein exemplified embodies a flexible cable 16 connected to a hook or ring 17 carried by the frame 9 at a point close above the wheel 6, said cable being thence directed over a pulley 18 mounted on a suitable part of the vehicle frame in front of the rear axle, and being connected at its front end to an operating lever, as 19, located at a point within convenient reach of the driver's seat. The lever 19 is thrust forward when it is desired to swing the frame to its forwardly thrust inoperative position, said frame traveling between suitable curved guides 20 mounted upon the bracket 1. When, on the other hand, it is desired to drop the frame and attached parts to operative position, the lever 19 is swung rearward, whereupon said frame gravitates to vertical position, being guided into place between the side members of the bracket 1 by said guide members 20.

One or more guide-rods, as 21, are preferably directed upward from the upper end of the frame 9, said rods being vertically movable through the crosshead 4. As the wheel 11 travels over rough or uneven surfaces in the roadway, the frame 9 rises in an obvious manner against the tension of the spring 12 to permit said wheel to pass over said surfaces.

While the mechanism hereinbefore described may alone be used for preventing skidding of the car to which it is attached, it may have associated therewith gearing whereby the wheel 11 may be driven for affording traction for the car in cases of emergency, as when it becomes necessary to assist the rear wheels of the car from a ditch, mud-hole, or the like. The form of gearing preferred for this purpose is illustrated in Figs. 3 and 4 of the drawings, wherein a supporting bracket 22 is shown mounted upon the axle between the bracket 1 and the adjacent wheel 3, said bracket having a pair of horizontally alined bearings 23 in which is journaled a shaft 24 having a pinion 25 splined thereon at its outer end adapted to be moved into and out of operative relation to an internal gear 26 carried by the brake-drum 27 of the adjacent traction wheel 3 of the car. Mounted upon the opposite end of the shaft 24 is a sprocket wheel 28 which is connected by a sprocket chain 29 to a sprocket wheel 30 carried on a projecting end of the axle 10, said sprocket wheels being normally disposed in vertical alinement. While the pinion 25 may be shifted to and from operative position by any appropriate mechanism, I prefer to employ a horizontally shiftable rod 31 having a clutch yoke 32 on its outer end disposed in operative relation to the hub of said pinion. The opposite end of said rod 31 is pivotally connected to one arm of a bell-crank lever 33 which is pivoted at a suitable stationary point, as upon one of the bearings 23. The opposite arm of said bell-crank has pivotally connected thereto the rear end of a rod 34 which extends forward, as shown in Fig. 6, and is connected to a suitably located operating lever or foot pedal 35.

Due to the fact that the axes of the trunnions 5 and the sprocket wheel 28 are located in different planes, it is obviously necessary, in order to permit the elevation of the frame 9 and associated parts, to employ a chain 29 of greater length than is necessary under normal conditions to connect sprocket wheels 28 and 30. The slack created by the excess length of chain is taken up preferably by means of an idler sprocket 36 journaled on a wrist pin 37 carried by the lower end of an inclined arm 38 which is loosely mounted at its opposite end upon the projecting inner end of the shaft 24. Said arm 38 is yieldingly held in a forwardly thrust position, as shown in Fig. 4, by a suitable spring, as a coil spring 39, interposed between said arm and a plate 54 which is carried by and is vertically movable on the face of the frame 9. Said coil spring 39 encircles a guide rod or stem 55 which is fixed at its front end to the arm 38 and which has its rear end movable through said plate 54.

Mechanism is provided for locking the frame 9 in seated position within the embrace of, or between the lateral members 1ª of the bracket 1, thus rendering the apparatus equally operative when the car is being reversed. Said mechanism comprises a vertically movable member 40 of Z-shape having vertically disposed stems 41 fixed on its upper and lower ends received in lug-like guides 42 rigidly carried on the outer face of the innermost lateral bracket member 1ª. The inclined body portion of said Z-shaped member 40 is movable through an eye provided in the projecting head 43ª of a bolt 43 which is horizontally movable through said member 1ª and has its point received in a vertical slot 44 provided therefor in the adjacent edge of the frame 9. Connected to the upper stem 41 of said member 40 is one end of a cable 45 which extends vertically to and over a loose pulley 46 located at a suitable point, as on the adjacent trunnion 5 of the cross-head 4. From said pulley said cable extends forward and is passed about a pulley 47 located on the shaft 48 upon which is mounted the operating lever 19, hereinbefore mentioned; thence said cable extends upward and connects to the forwardly projecting arm of a lever 49 of substantially bell-crank form which is pivoted to said lever 19 in a position wherein it may be operated simultaneously with the elevation of the usual pivoted rack-engaging pawl 50 of the last-mentioned lever, said pawl being connected by a link 51 to said cable 45 at an appropriate point, as shown in Fig. 6.

As is obvious from the foregoing, when it is desired to shift the mechanism from operative to inoperative position, the upper end of the lever 19 and the adjacent arm of the bell-crank 49 are grasped by hand and said arm is initially pressed back. This action results, through the cable 45, in elevating the Z-shaped member 40 against the tension of a suitably arranged depressing spring 52, withdrawing the bolt 43 from interlocking relation to the frame 9, whereupon the latter may be unobstructedly swung forward by thrusting the lever 19 forward. When the frame is returned to operative position, the pin 43 is held in retracted position until the frame is seated within the embrace of the bracket 1, whereupon it is released for locking the said parts.

What is claimed is—

1. The combination with the rear axle of an automobile, of a bracket mounted on said axle, a vertically yieldable frame mounted to swing with respect to said bracket, a wheel carried by said frame for traveling upon the roadway, road-engaging rocker-members pivotally carried by said wheel, and means for swinging said frame forward for withdrawing said wheel from the roadway.

2. The combination with the rear axle of an automobile, of a bracket mounted on said axle, a vertically yieldable frame mounted to swing with respect to said bracket, a wheel carried by said frame for traveling upon the roadway, road-engaging rocker-members pivotally carried by said wheel, means for interlocking said frame against swinging movement, means for disengaging said interlocking means, and means for elevating said frame for withdrawing said wheel from the roadway.

3. The combination with the rear axle of an automobile, of a bracket mounted on said axle, a frame mounted on said bracket and adapted to swing to and from a vertical position, means for locking said frame in a vertical position, a wheel carried by said frame for traveling upon the roadway, road-engaging rocker-members pivotally carried by said wheel, means permitting said wheel to yield with respect to said bracket, means for disengaging said locking means, and means for swinging said frame to a position wherein said wheel is withdrawn from the roadway.

4. The combination with the rear axle of an automobile, of a bracket mounted on said axle, a frame mounted on said bracket and adapted to swing to and from a vertical position, means for locking said frame in a vertical position, a wheel carried by said frame for traveling upon the roadway, road-engaging rocker-members pivotally carried by said wheel, yieldable means permitting said wheel to pass over uneven surfaces, and gearing interposed between an adjacent traction wheel and the frame-carried wheel whereby traction power is transmitted to the latter.

5. The combination with the rear axle of an automobile, of a bracket mounted on said axle, a frame mounted on said bracket and adapted to swing to and from seated position with respect to said bracket, means for locking said frame in said seated position, a wheel carried by said frame for traveling upon the roadway, road-engaging rocker-members carried by said wheel, yieldable means permitting said wheel to pass over uneven surfaces, gearing interposed between an adjacent traction wheel and the frame-carried wheel whereby traction power is transmitted to the latter, means for disengaging said locking means, and means for swinging said frame to a position wherein said wheel is withdrawn from the roadway.

6. The combination with the rear axle of an automobile, of a bracket mounted on said axle, a frame mounted on said bracket and adapted to swing to and from a vertical position, means for locking said frame in a vertical position, a wheel carried by said frame for traveling upon the roadway, road-engaging rocker-members carried by said wheel, yieldable means permitting said wheel to pass over uneven surfaces, gearing interposed between an adjacent traction wheel and the frame-carried wheel whereby traction power is transmitted to the latter, said gearing embodying a shiftable member, and means for shifting said member to and from a position rendering said gearing operative.

In testimony whereof, I affix my signature in presence of two subscribing witnesses.

THEODORE T. SEAL.

Witnesses:
H. E. DUNLAP,
W. F. KEEFER.